(12) United States Patent
Ajagbe

(10) Patent No.: US 8,624,554 B2
(45) Date of Patent: Jan. 7, 2014

(54) SOLAR BRACELET

(76) Inventor: Adebowale Ajagbe, Detroit, MI (US)

(*) Notice: Subject to any disclaimer, the term of this patent is extended or adjusted under 35 U.S.C. 154(b) by 323 days.

(21) Appl. No.: 13/228,151

(22) Filed: Sep. 8, 2011

(65) Prior Publication Data

US 2012/0293107 A1 Nov. 22, 2012

Related U.S. Application Data

(60) Provisional application No. 61/487,051, filed on May 17, 2011.

(51) Int. Cl.
*H01M 10/46* (2006.01)
(52) U.S. Cl.
USPC ............................................... 320/114
(58) Field of Classification Search
USPC .......... 320/101, 107, 112, 114, 115; 362/103, 362/104; 136/243, 245, 251, 291
See application file for complete search history.

(56) References Cited

U.S. PATENT DOCUMENTS

| 3,910,257 | A | * | 10/1975 | Fletcher et al. | 600/483 |
| 8,459,825 | B2 | * | 6/2013 | Trzecieski | 362/157 |
| 2009/0251888 | A1 | * | 10/2009 | Douglas | 362/103 |
| 2010/0308725 | A1 | * | 12/2010 | Trzecieski | 315/32 |

* cited by examiner

*Primary Examiner* — Edward Tso
(74) *Attorney, Agent, or Firm* — Gifford, Krass, Sprinkle, Anderson & Citkowski, P.C.; John Chau

(57) ABSTRACT

A device configured to be worn around the wrist of a user and operable to charge an electrical device is provided. The device includes a cover and a band. The band is adapted to be worn around a wrist of a user. The cover may be adapted to mount onto the band. The band having a storage space configured for holding electrical components operable to store and discharge electrical power, such as a battery. The device further includes an output operable to connect the battery to an electrical device so as to charge the electrical device.

18 Claims, 2 Drawing Sheets

SOLAR BRACELET

CROSS-REFERENCE TO RELATED APPLICATIONS

This application claims the benefit of U.S. Provisional Application 61/487,051 filed on May 17, 2011, the disclosure of which is incorporated by reference herein in its entirety.

FIELD OF THE INVENTION

The invention relates to a device worn on the wrist of a user operable to harness solar energy and other renewable energy sources by which passive or active use of the device is operable to store energy for later use with an electrical device such as a cellular phone.

BACKGROUND OF THE INVENTION

The use of solar energy to charge a cellular phone is currently known and used. However, such devices are stand-alone stationary devices such as a docking station. The docking station is operable to connect the cellular phone so as to charge the cellular phone. Accordingly, it remains desirable to have a device which may be worn as part of the user's outfit and is conveniently located so as to allow the user to operate a cellular phone while charging the cellular phone simultaneously while on the go.

SUMMARY OF THE INVENTION

According to one aspect of the invention, a device having solar cells and a battery for storing solar power. The device further includes a cover and a band. The band is adapted to be worn around a wrist of a user. The cover may be adapted to mount onto the band. The band includes a storage space configured for holding electrical components operable to store and discharge electrical power.

The device includes a battery adapted to store and discharge electrical power, and at least one solar cell operable to transform light into electrical power. The solar cell is in electrical communication with the battery and operable to charge the battery. The device may further include an electrical circuit operable to control the charge and discharge of electricity to and from the battery.

The storage space may further contain an electrical chord and a mechanism operable to retract the electrical chord. The electrical chord may include an end portion adapted to engage power input of an electrical device, such as a cellular phone.

In a first preferred embodiment, the cover encircles the band. The cover includes a plurality of solar cells. The solar cells are electrically wired to the battery so as to charge the battery. Electrical power from the solar cells may be filtered through an electrical circuit operable to control charging of the battery. The electrical circuit may also control the discharging of the electrical power stored in the battery.

The covers may be decorated with design and indicia. The solar cells may be colored so as to present an aesthetically pleasing accessory for wear with an outfit. The covers may be removed from the band so as to allow the user to change covers according to the user's choice. In one embodiment, the device may include a fastening device such as a clasp, operable to secure the cover with respect to the band.

The device may further include an electrical energy generating mechanism operable to transform movement into electrical energy, such as an auxiliary device. Specifically, the auxiliary device converts the swaying of a user's arm into electricity. The auxiliary device may also be wired to the battery so as to charge the battery.

The band includes in first surface and a second surface. The first surface of the band is covered by the cover, and the second surface of the band is exposed to the wrist of a user when worn. The storage space is disposed between the first and second surfaces. The storage space may including mounting portions operable to hold various electrical components such as the battery, the electrical circuit, electrical chord, and mechanism for retracting the electrical chord.

In a second preferred embodiment, the band includes a base portion, and the cover is adapted to be disposed over the base portion. The cover includes a display. The base portion is configured to house electrical components operable to tell time. The time is shown on the display.

The battery is also stored on the base portion and covered by the cover. The outer surface of the cover includes at least one solar cell. The solar cell is electrically wired to the battery so as to charge the battery. Electrical power from the solar cells may be filtered through an electrical circuit operable to control charging of the battery. The electrical circuit may also control the discharging of the electrical power stored in the battery.

BRIEF DESCRIPTION OF THE DRAWINGS

Advantages of the present invention will be readily appreciated as the same become understood by reference to the following detailed description when considered in connection with the accompanying drawings wherein.

DETAILED DESCRIPTION OF THE INVENTION

Figure 1:
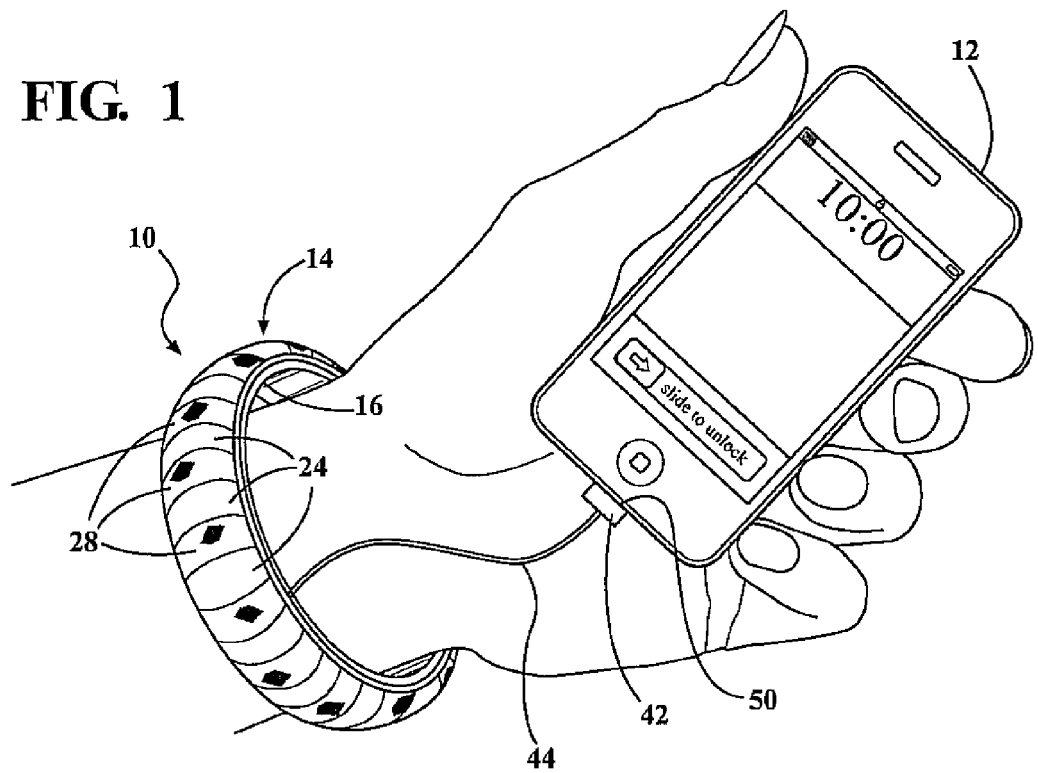
FIG. 1 is a perspective view showing a first preferred embodiment of the device worn on the wrist of a user holding a cellular phone.

With reference now to the figures, a device 10 configured to be worn around the wrist of a user and operable to charge an electrical device 12 is provided. The device 10 includes a cover 14 and a band 16. The band 16 is adapted to be worn around a wrist of a user. The cover 14 may be adapted to mount onto the band 16. The band 16 includes a storage space 18 configured for holding electrical components operable to store and discharge electrical power, such as a battery 20. The device 10 further includes an output 22 operable to connect the battery 20 to an electrical device 12 so as to charge the electrical device 12.

Figure 2:
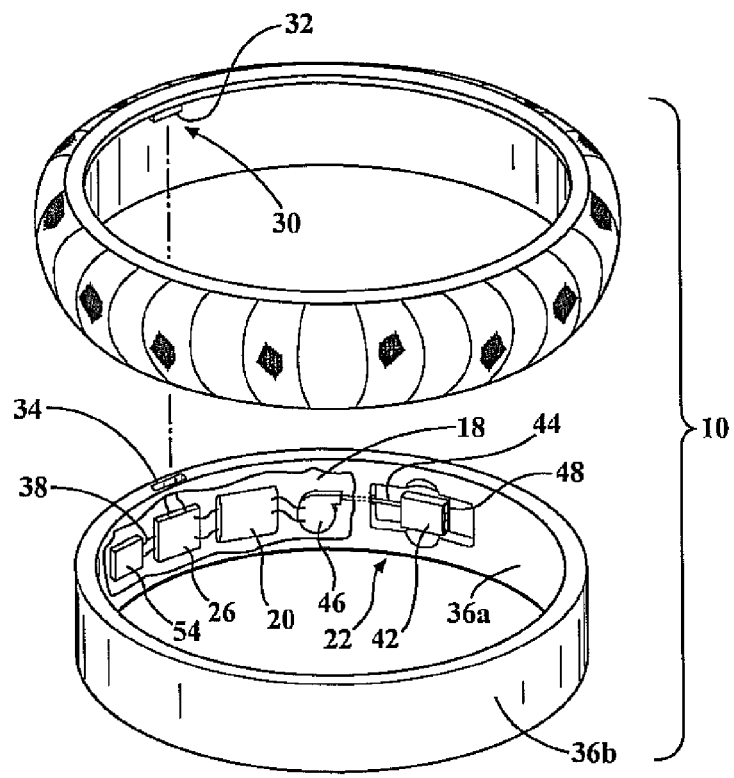
FIG. 2 is an exploded view of the device of FIG. 1.

Referring first to FIGS. 1-2, an illustration of a first preferred embodiment of the device 10 is provided. The band 16 is a circular member adapted to be worn on the wrist of a user. The band 16 may be formed from a rigid and durable material such as gold, silver or a hardened plastic. Alternatively, the band 16 may be formed from an expandable material such as rubber.

The cover 14 encircles the band 16 and is adapted to be mounted onto the band 16. The cover 14 includes a plurality of solar cells 24. The solar cells 24 are electrically wired to a battery 20. The battery 20 is operable to store and discharge electrical power. The solar cells 24 as operable to collect solar energy and transform the solar energy into electricity so as to charge the battery 20. Electrical power from the solar cells 24 may be filtered through an electrical circuit 26 operable to control charging of the battery 20. The electrical circuit 26 may also control the discharging of the electrical power stored in the battery 20. The battery 20 may be a rechargeable battery 20 such as a lithium ion battery 20 or any other battery 20 currently known and used in the art for storing electrical power.

The device 10 may use a plurality of covers 14, each cover 14 may be decorated with design and indicia. The solar cells 24 may be colored so as to present an aesthetically pleasing accessory for wear with an outfit. As shown in FIGS. 1 and 2, the solar cells 24 alternate between decorative panels 28.

The covers 14 may be removed from the band 16 so as to allow the user to change covers 14 according to the user's choice. In one embodiment, the device 10 may include a fastening device 30 operable to secure the cover 14 with respect to the band 16. Specifically, the fastening device 30 is a male member 32 formed of an electric conducting material. The solar cells 24 are wired to the male member 32. The fastening device 30 is operable to engage a female member 34 so as to provide electrical connection between the solar cells 24 and the battery 20.

The band 16 includes in first surface 36a and a second surface 36b. The first surface 36a of the band 16 is covered by the cover 14, and the second surface 36b of the band 16 is exposed to the wrist of a user when worn. The storage space 18 is disposed between the first and second surfaces 36a, 36b. The storage space 18 may include mounting portions 38 to hold various electrical components such as the battery 20, and the electric circuit.

With reference now to FIG. 2, the storage space 18 may further house the output 22. The output 22 may be exposed on the second surface 36b of the band 16. The second surface 36b of the band 16 includes a detent 40 so as to keep the output 22 behind the second surface 36b of the band 16 with respect to the user's wrist. The output 22 is an adapter 42 electrically connected to the battery 20. Thus, a user may mount a micro-USB chord or the like to the adapter 42 so as to charge the electrical device 12.

Figure 3:
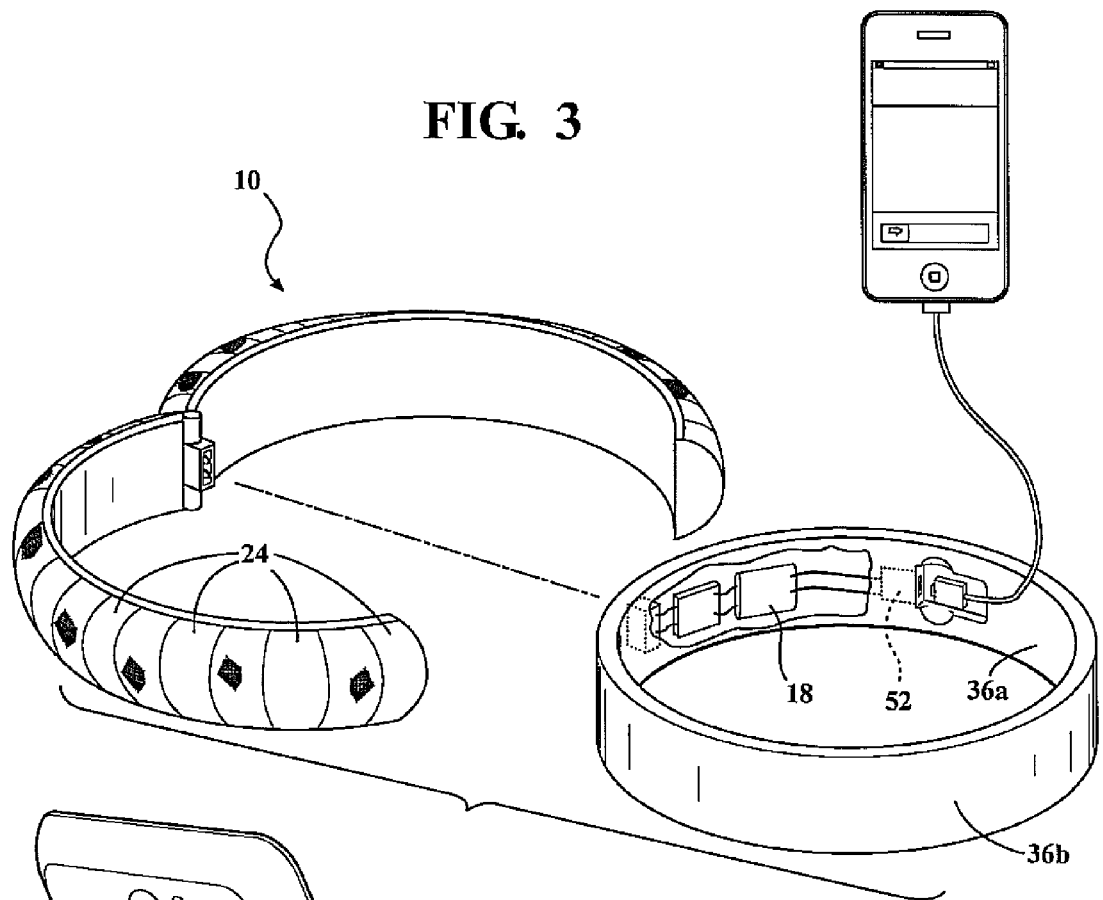
FIG. 3 is a view of the device of FIG. 1 having a cover hingedly mounted onto a band.

It should be appreciated that the cover 14 may be adapted to mount onto the band 16 in other ways. With reference now to FIG. 3, the cover 14 includes a hinge. A fastener is mounted onto the hinge and exposed to the first surface 36a of the band 16. The fastener is a male member 32 formed of an electric conducting material. The solar cells 24 are wired to the male member 32. The fastening device 30 is operable to engage a female member 34 so as to provide electrical connection between the solar cells 24 and the battery 20.

The output 22 may include an electrical chord 44 and a mechanism 46 operable to retract the electrical chord 44. The electrical chord 44 may include an end portion 48 adapted to engage power input 50 of an electrical device 12, such as a cellular phone. One end of the electrical chord 44 is wired to the battery 20 and the other end of the electrical chord 44 includes an adapter 42 configured to engage the power input 50 of an electrical device 12. Any such adapters 42 currently known and used in the art may be adapted for use herein, illustratively include a micro-USB port 52.

The bracelet may further include an auxiliary electric device 54, operable to transform the swaying motion of an arm into electricity. For instance, such technology is currently known and used and disclosed in WO/2005/100787 which is incorporated herein by reference. The auxiliary device 10 may also be wired to the battery 20 so as to charge the battery 20. The electric circuitry may be further operable to step down electrical power generated by the auxiliary device 10.

The cord may be pulled and connected to a cellular phone so as to charge the cellular phone. Such connectors are currently known and used and illustratively include a micro-USB port 52. Accordingly, as shown in FIG. 1, the user may wear the bracelet as a fashion accessory and may power the cellular phone while holding the cellular phone in his or her hand.

Figure 4:
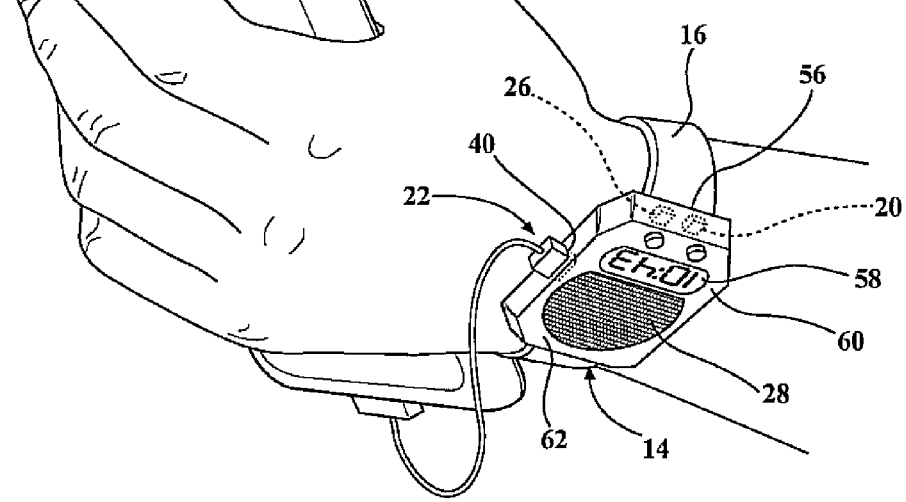
FIG. 4 is a perspective view of the second preferred embodiment of the present invention.

With reference now to FIG. 4, a second preferred embodiment of the present invention is provided. In a second preferred embodiment, the band 16 includes a base portion 56, and the cover 14 is adapted to be disposed over the base portion 56. The cover 14 includes a display 58. The base portion 56 is configured to house electrical components operable to tell time. The time is shown on the display 58.

The battery 20 is also stored on the base portion 56 and covered by the cover 14. The outer surface 60 of the cover 14 includes at least one solar cell 24. The solar cell 24 is electrically wired to the battery 20 so as to charge the battery 20. Electrical power from the solar cells 24 may be filtered through an electrical circuit 26 operable to control charging of the battery 20. The electrical circuit 26 may also control the discharging of the electrical power stored in the battery 20.

The cover 14 includes four side walls extending generally orthogonal to a face plate 62. The display 58 is mounted to the faceplate. An outer surface 60 of the cover 14 includes a detent 40, the output 22 is exposed on the outer surface 60 of the cover 14 and within the detent 40 so as to be behind the outer surface 60 of the cover 14. Specifically, the detent 40 is disposed on one of the sidewalls of the cover 14.

The output 22 is an adapter 42 configured to engage an electrical chord 44 operable to connect to the power input 50 of an electrical device 12. Thus a user may simply attach an electrical chord 44 with the appropriate USB connection between the adapter 42 and the electrical device 12 such as a cellular phone to charge the cellular phone.

Accordingly, as shown in FIG. 4, the user may wear the watch as a fashion accessory and may power the cellular phone while holding the cellular phone in his or her hand.

The invention has been described in an illustrative manner. It is therefore to be understood that the terminology used is intended to be in the nature of words of description rather than limitation. Many modifications and variations of the invention are possible in light of the above teachings without varying from the scope and spirit of the invention described herein.

The invention claimed is:

1. A device for charging an electrical device, the device configured to be worn around a wrist of a user, the device comprising:
   a band adapted to be worn around the wrist, the band having a storage space configured for holding components;
   a cover having an outer surface exposed to the environment, the cover adapted to mount onto the band;
   a battery;
   at least one solar cell disposed on the outer surface of the cover, the at least one solar cell electrically wired to the battery; and
   an output operable to connect the battery to the electrical device so as to charge the electrical device while the user holds the electrical device.

2. The device as set forth in claim 1, further including an electrical circuit operable to control discharging and charging of the battery.

3. The device as set forth in claim 2, the cover may be decorated with design and indicia so as to present an aesthetically pleasing accessory for wear with an outfit.

4. The device as set forth in claim 3, including a plurality of covers, each of the plurality of covers are removably attached to the band so as to allow the user to change the cover with a different covers.

5. The device as set forth in claim 4, further including a fastening device, operable to secure and release the cover to and from the band.

6. The device as set forth in claim 5, further including a female member disposed on the band, the female member in electrical connection with the battery, the fastening device is a male member electrically connected to the solar cell, the male member configured to engage the female member so as to secure the cover to the band and transmit electricity from the solar cell to the battery.

7. The device as set forth in claim 2, wherein the band includes in first surface and a second surface, the first surface of the band is covered by the cover, and the second surface of the band is exposed to the wrist of a user when worn, the band further including at least one mounting portion disposed on the first surface of the band, the one of the at least one mounting portions configured to hold the battery, and another of the at least one mounting portions is configured to hold the electric circuit.

8. The device as set forth in claim 2, wherein the output includes a electrical chord and a mechanism operable to retract the electrical chord, the electrical chord and mechanism stored within the storage space, the electrical chord having an end portion adapted to engage a power input of an electrical device, the other end of the electrical chord is wired to the battery.

9. The device as set forth in claim 8, wherein the end portion includes an adapter configured to engage an electrical chord operable to connect to the power input of an electrical device.

10. The device as set forth in claim 9 wherein the adapter is a micro-USB port.

11. The device as set forth in claim 2, wherein the second surface of the band includes a detent, the output is exposed on the second surface of the band and within the detent so as to be behind the second surface of the band with respect to the user's wrist.

12. The device as set forth in claim 2, further including an auxiliary electric device operable to transform the swaying motion of an arm into electricity, the auxiliary device is wired to the battery so as to charge the battery.

13. The device as set forth in claim 11, wherein the electric circuitry may be further operable to step down electrical power generated by the auxiliary device.

14. The device as set forth in claim 2, wherein the cover includes a hinge operable to displace one end of the cover with respect to an opposite end of the cover, the hinge having a fastening device operable to secure the cover to the band.

15. The device as set forth in claim 14, further including a female member disposed on the band, the female member in electrical connection with the battery, the fastening device is a male member electrically connected to the solar cell, the male member configured to engage the female member so as to secure the cover to the band and transmit electricity from the solar cell to the battery.

16. The device as set forth in claim 2, wherein the band includes a base portion, the cover includes a display and the cover is adapted to be disposed over the base portion, the device further includes electrical components operable to tell time, the electrical components contained between the cover and the base portion, time is shown on the display.

17. The device as set forth in claim 16, wherein the outer surface of the cover includes a detent, the output is exposed on the outer surface of the cover and within the detent so as to be behind the outer surface of the cover.

18. The device as set forth in claim 17, wherein the output is an adapter configured to engage a electrical chord operable to connect to the power input of an electrical device.

* * * * *